United States Patent [19]

Cross

[11] 4,353,080

[45] Oct. 5, 1982

[54] CONTROL SYSTEM FOR ELECTROGRAPHIC STYLUS WRITING APPARATUS

[75] Inventor: David A. Cross, Wrestlingworth, England

[73] Assignee: Xerox Corporation, Stamford, Conn.

[21] Appl. No.: 105,800

[22] Filed: Dec. 20, 1979

[30] Foreign Application Priority Data

Dec. 21, 1978 [GB] United Kingdom ............... 49534/78

[51] Int. Cl.[3] .................... G03G 15/044; G01D 15/06

[52] U.S. Cl. ................................ 346/153.1; 346/155; 178/30; 118/660

[58] Field of Search ............... 178/30; 346/153.1, 155, 346/154; 118/652, 660

[56] References Cited

U.S. PATENT DOCUMENTS

| | | | |
|---|---|---|---|
| 2,848,535 | 8/1958 | Hunt, Jr. | 178/30 |
| 3,145,071 | 8/1964 | Vance | 178/30 |
| 3,469,028 | 9/1969 | Yamamoto | 346/154 |
| 3,530,456 | 9/1970 | Holloman | 178/30 |
| 3,611,419 | 10/1971 | Blumenthal | 346/155 |
| 3,624,661 | 11/1971 | Shebanow et al. | 178/30 |
| 3,859,960 | 1/1975 | Lloyd | 118/660 |
| 4,030,107 | 6/1977 | Tagawa | 346/155 |
| 4,115,763 | 9/1978 | Brown, Jr. et al. | 346/154 |

*Primary Examiner*—Marshall M. Curtis
*Attorney, Agent, or Firm*—W. Douglas Carothers, Jr.

[57] ABSTRACT

In a matrix array for the supply of an electrographic stylus writing apparatus, a plurality of styli are driven by short pulses through R/C networks. The styli are divided into subgroups and parallel capacitors connect the styli of each subgroup to a high voltage switch which is responsive to a capacitor pulse driver. Each stylus is also driven through a resistive line which completes the R/C circuit. The resistive lines are connected in parallel for similar styli of each group to a resistor enable pulsing circuit and all resistive lines are connected via isolation diodes to a resistor reset means. In operation, a short pulse from the capacitor driver circuit is applied to all the capacitors of a single group and an enabling pulse is applied to a predetermined single resistive line of each group so that the combined, enabled R/C circuit for a single stylus within one of groups is activated.

5 Claims, 8 Drawing Figures

CONTROL SYSTEM FOR ELECTROGRAPHIC STYLUS WRITING APPARATUS

BACKGROUND OF THE INVENTION

1. Field of the Invention

The invention relates to an electrographic stylus writing apparatus.

In an electrographic stylus writing apparatus it is usual to have a plurality of exposed styli and to move a recording medium past the exposed styli. The record medium is conventionally a conductive material having a dielectrically coated surface which is presented to the styli as the record medium moves past the head. The head is responsive to input signals and arranged to select individual styli or groups of styli so as to form a surface charge image on the recording medium, which image is later developed elsewhere in the printing system. Considerable electrical energy is often required to ensure that the relative potential between styli and record medium is achieved to enable writing by causing ionisation of the gap between the styli and the medium so that the surface charge image can be formed. Considerable energy is lost in conventional systems in producing the relative potentials due to inefficiencies in the driving systems. The actual energy involved in charging the air gap at the stylus tip can be very little.

2. Description of the Prior Art

In U.S. Pat. No. 3,859,960 for example, selected styli and a backing plate behind the record medium are energised simultaneously with signals of opposite polarity to enable writing. In U.S. 3,611,419, the front plates and styli are energised by signals of opposite polarity, on the styli and front plates, and a capacitive coupling is formed with the record medium to enable writing. In both U.S. Pat. Nos. 3,859,960 and U.S. 3,611,419, it is normally required in practice, to avoid false writing, to energise groups of styli separated by groups of non-energised styli. This is achieved as specifically described in U.S. Pat. No. 3,611,419 by making sure adjacent front plates are not energised simultaneously.

In U.S. Pat. No. 4,030,107, an R-C matric arrangement is disclosed for energising an array of gas discharge electrodes..

SUMMARY OF THE INVENTION

It is an object of this invention to provide an improved R-C matrix system for energising the styli in an electrographic stylus writing apparatus, and in particular to reduce the number of high voltage driver circuits by using a plurality of selectable switches coupled to each drive circuit.

It is another object of the invention to reduce the number and cost of very fast switching transistors by using time sequence control of the selection of the switches and the application of operative phases.

Two unique operative signals are required to cause writing of any stylus in the stylus head and the application of operative and selection signals in sequence eliminates the need for outof-phase operation previously used to avoid false writing if adjacent styli or blocks of styli were energised at least partially by leakage.

According to the invention there is provided an electrographic stylus writing apparatus including a set of styli, a matrix connected to supply selectively to each stylus two electrical pulses which are required to have coincidence to render the stylus operative, first electrical drive means for supplying one of said two pulses which is connected in parallel to said matrix through a plurality of first selectable switches and resistors, second electrical drive means for supplying the other of said two pulses which is connected to said matrix through a plurality of second selectable switches and capacitors, electrical control means arranged to open and close said first and second selectable switches such that the pulses are applied to operate each stylus as required, and timing means arranged to control the selection of said first selectable switches to be made before the application of supply from said first electrical drive means and to control the selection of said second selectable switches to be made before the application of supply from said second electrical drive means.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

Figure 1:
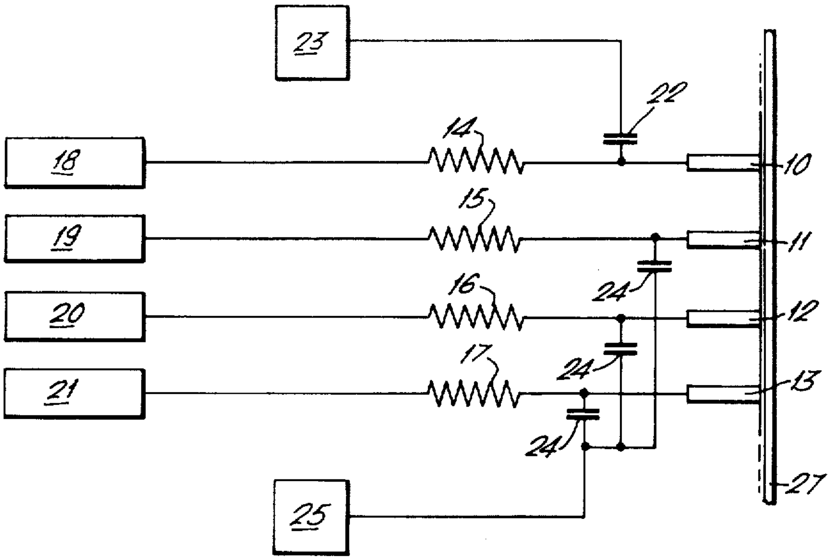
FIG. 1 shows schematically the electrical configuration of an electrograpic printing head.

Referring to the drawings, FIG. 1 shows part of the stylus array circuitry which will be described in more detail below with reference to FIG. 5. The styli 10 to 13 are each connected through respective resistors 14 to 17 to different data switches 18 to 21. The stylus 10 is capacitively coupled by capacitor 22 to a block switch 23 and the styli 11 to 13 are all capacitively coupled by common capacitor 24 (shown in FIG. 1 for ease of explanation, as separate capacitors) to another switch 25. Thus, each stylus is connected to receive drive pulses from two diferent drive pulse supplies via switches 18 to 21 and via switches 23 and 25 and capacitors 22 and 24 respectively.

Figure 2:
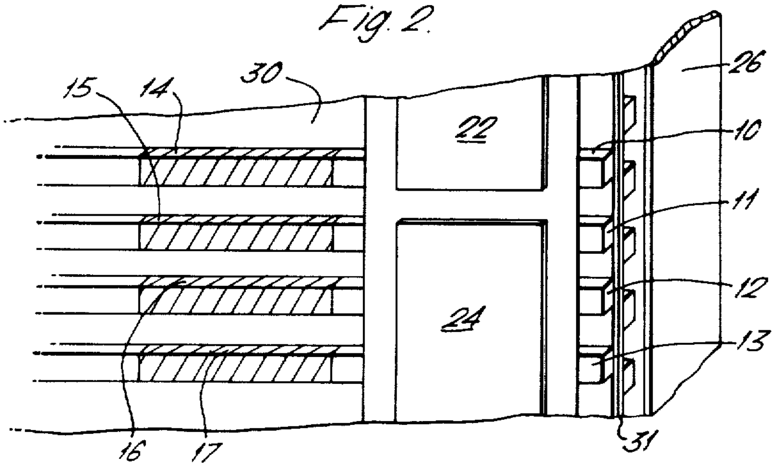
FIG. 2 shows diagrammatically a plan view of the head.

In use, to enable a stylus to write it is supplied in sequence with a first drive signal through its resistor and a second drive signal of the same polarity through its capacitor. If the first signal is present, then on application of the second drive signal the voltage at the stylus is raised above the Paschen breakdown voltage so that an electrostatic charge can be applied to a record medium opposite that stylus. One earthing plate 26 is shown in FIG. 2 whic contacts the record medium 27 (see FIG. 1), moving past the end of the styli in use, to prevent the record medium developing an overall potential. In practice, in the configuration shown, we apply a negative potential of around 300 volts as the first drive signal. The second drive signal is also at a negative potential of around 300 volts. It will be appreciated that if either a first or second drive signal is applied alone to any stylus, the stylus voltage between the stylus and record medium will not exceed about 300 volts which is less than the Pashen breakdown voltage required.

The "Paschen breakdown voltage" is the voltage at which the insulation of the air breaks down and an avalanche condition ensues allowing ions to flow from the stylus to the record medium. The breakdown voltage varies with the separation of stylus and record medium and ambient conditions but in the configuration of FIG. 1, it can be expected to be around 450 volts.

In the configuration shown, writing is achieved by the application of both drive signals. Other arrangements are possible, for example writing can be inhibited by such conditions and writing achieved by the absence of the first drive signal. That is, the breakdown threshold can be set, by biasing the record medium, at around −200 volts for the styli and the first drive signal arranged to be +250 volts, say. Thus, on the application of the first drive signal the potential of the stylus rises to around +250 volts so that the result of applying the second drive signal is to reduce the potential of the stylus to near zero volts. Thus, in the absence of the first drive signal, the second drive signal causes the potential of the stylus to drop to −250 volts, so that as the Paschen voltage lever is −200 volts, in this case, writing occurs.

It will be appreciated that other drive signal combinations can be used to control the write and non-write conditions of the styli and that the datum voltage of the record medium can be adjusted as required. However, in each case the styli are driven by the application of non-application of a first signal applied to the resistive coupling which is then followed by the application of a second drive signal to the capacitor coupling. The sequence of application of first and second drive signals is controlled by logic circuit means explained below.

In the description of the high voltage supply system which follows, the operative writing condition of such stylus is achieved by the generally simultaneously occurring application of two negative 300 volt pulses, although it will be appreciated that the supply system may be altered to provide other polarity pulses to achieve the other operative combinations as required in the previous two paragraphs.

It will be noted that the choices of the actual values of the resistive (R) and capacitive coupling (C) tends to represent a compromise. On application of the first signal a finite time rise (or fall as the case may be) can be reduced if the time constant of the RC circuit is kept low enabling the second signal to be applied very soon after the application of the first signal. However, if the time constant is low, on application of the second signal, the voltage pulse at the end of the stylus caused by the second signal will then be very narrow thus causing a very brief voltage excursion through the Paschen breakdown level. By contrast, if the time constant is higher, this Paschen voltage excursion is longer but the second drive signal must be delayed somewhat after the application of the first signal to allow the stylus potential caused thereby to rise or fall to the first signal level. In practice in the described arrangement, we use resistance values of 200K ohms approximately and capacitive values of 15 picofarads approximately.

Figure 3:
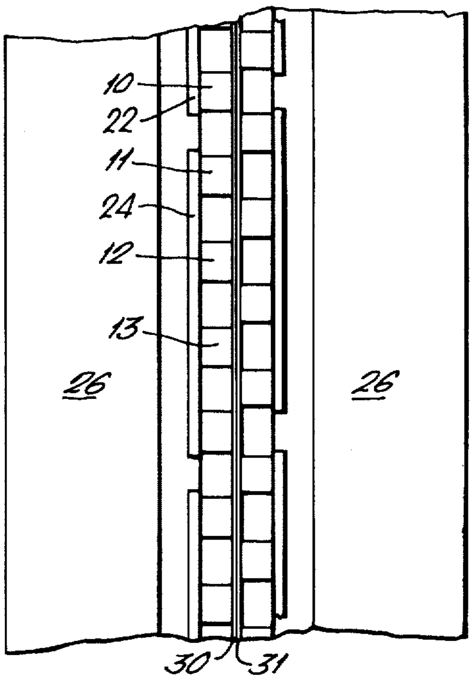
FIG. 3 shows a side view of the head of FIG. 2.
Figure 4:
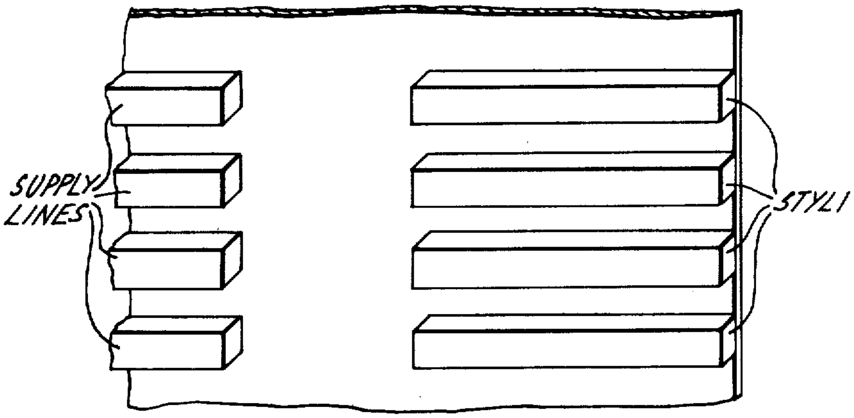
FIG. 4 shows isometrically a block of material on which the head can be formed.

In FIGS. 2 and 3, the styli 10 to 13 are formed of copper plating mounted on a substrate 30. The resistors 14 to 17 are formed of resistance material doped resin mounted on the substrate 30. The capacitors 22 and 24 are provided by a thin epoxy resin sheet fixed on to the stylus head and discrete copper plates or plating mounted on the resin sheeet.

A second row of styli are shown fixed to a second substrate 31 and form in effect a mirror image of the first row of styli. The second row of styli are however staggered with respect to the first row of styli to increase the lines per inch of writing, as is known in other stylus head proposals and to fill in gaps between styli of the previous rows to improve print quality. End plates 26 are provided at each side of the pair of stylus arrays. In practice these end plates are usually earthed and engage the surface of the record medium during printing.

Figure 5:
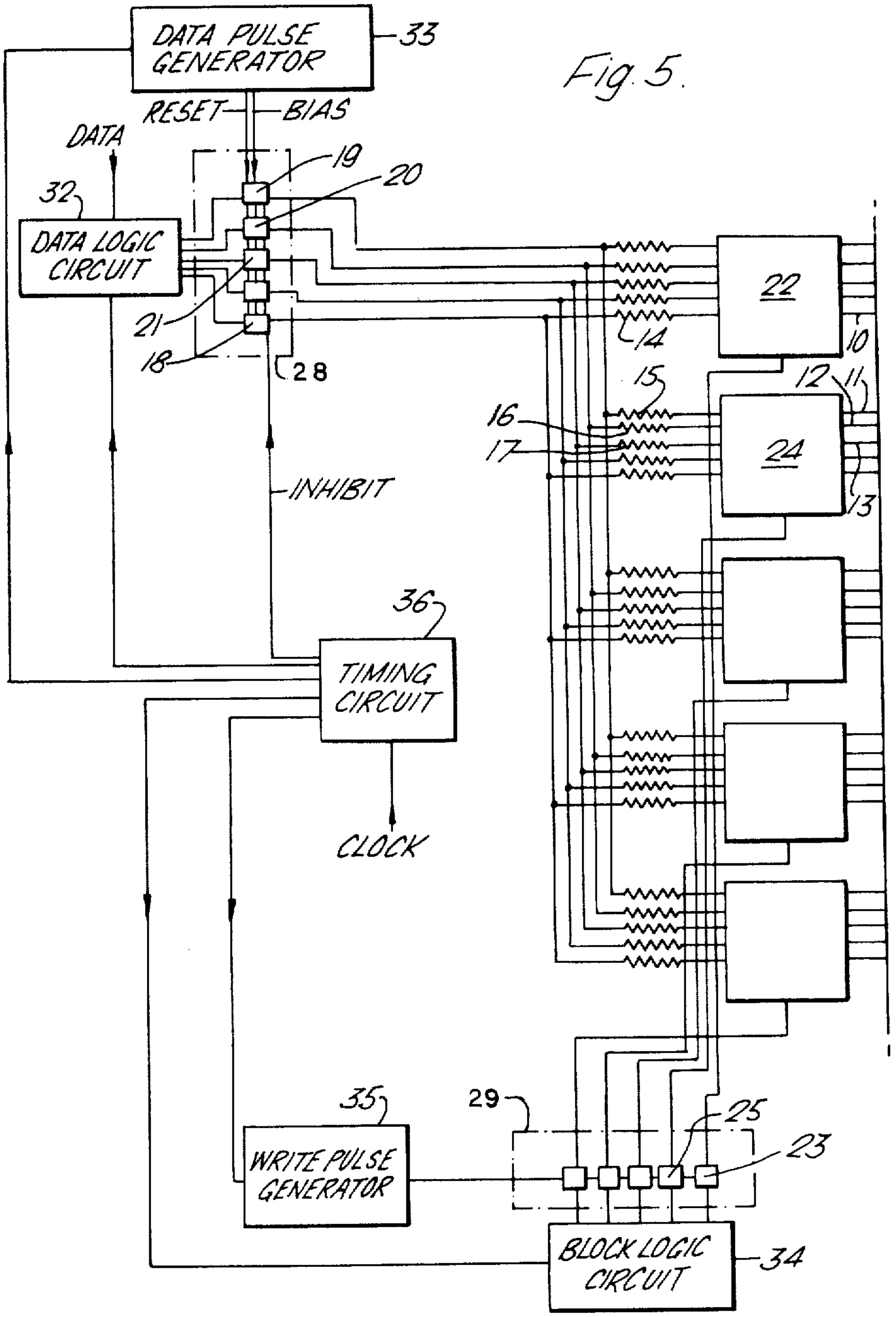
FIG. 5 shows schematically the circuit of the high voltage supply system.

In FIG. 5, a matrix is provided for connecting each of the styli 10 to 13, etc via individual resistors and in blocks or groups via capacitors 22, 24 etc to a plurality of data switches 28 and a plurality of block switches 29 respectively. A data logic circuit 32 is provided to open and close the switches 28 to supply pulses generated by a data pulse generator 33 to the styli. Similarly, a block logic circuit 34 is provided to open and close switches 29 to supply pulses generated by a write pulse genrator 35.

A timing circuit 36 is arranged to respond to clocked input signals to time-control the logic circuits 32 and 34 and the generators 33 and 35.

In use, serial video data is supplied to the data logic circuit 32 under timing control of the timing circuit 36 and converted into N-bit length blocks of stored parallel data. The parallel data or data block is then supplied to the data switches 28 which are also controlled by the timing circuit 36.

The data pulse generator 33 provides the high coltage output, resetting the previously set data switches, as explained more fully later with reference to FIGS. 6 and 8, to occur simultaneously with the beginning of each data block as controlled by the timing circuit 36. This is arranged such that the data switches 28 are inhibited during the application of a reset pulse. The block switches 29 are selectively enabled in practice some time before the writing pulse is applied in response to signals from the timing circuit 36.

Data switches 28 are selectively controlled in dependence upon video signals received so that some or all of the styli can be set to −300 volts by the application of the output of the data logic circuit 32 to such styli. The potential of −300 volts thus appears at the ends of all the selected styli but does not cause writing because a potential in excess of −380 volts is required to reach the Paschen breakdown level. Blocks of styli are capacitively coupled respectively to block switches 29 so that by selectively applying a short pulse of −300 volts to the capacitor blocks 22, 24, etc, all styli then set at −300volts to the capacitor blocks 22, 24, etc. all styli then set at −300 volts are driven more negative under any selected block to write charge onto the record medium.

Figure 6:
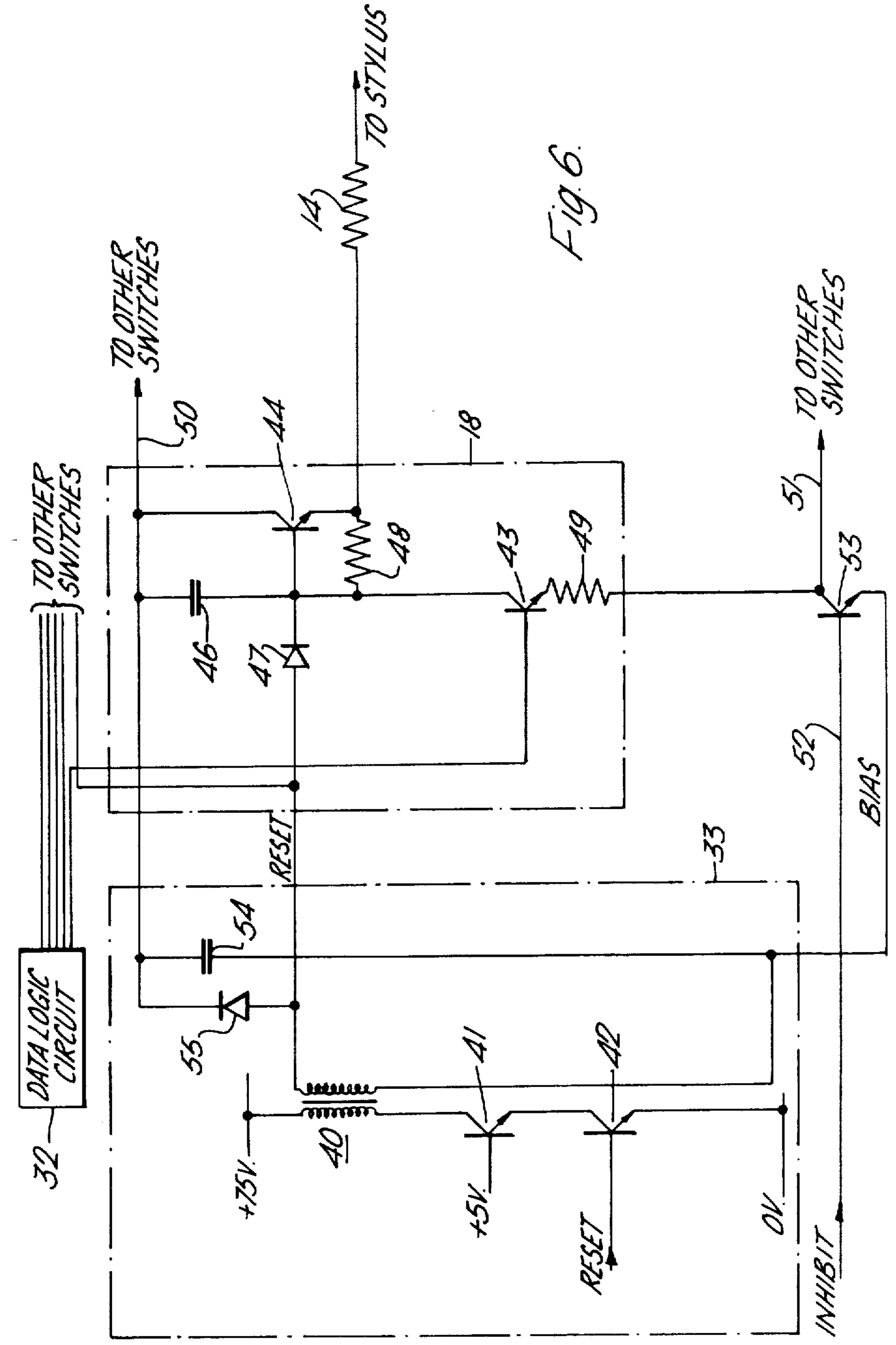
FIG. 6 shows the circuit diagram of one drive means and a data switch for the high voltage supply system.

In FIG. 6, which shows the circuits of the data pulse generator 33 and data switch 18, a four-to-one transformer 40 has its primary connected in series with transistors 41 and 42 between a 75 volt supply and earth. Data switch 18 consists of two transistors 43 and 44, a capacitor 46, a diode 47, and resistors 48 and 49. Connecting lines 50 and 51 are provided for connection to other data switches (not shown) of the data switches 28 (FIG. 6). The output of the transistor 44 comprises the drive or operative signal to a respective stylus through the resistor 14.

A line 52 from the timing circuit 36 is provided for supplying an inhibit signal, to enable control and phasing of the stylus head writing, to a transistor 53, connected between the output of transistor 43 and line 51. Note, the inhibit occurs when the transistor 53 is turned off.

In use, if data from the data logic circuit 32 requires writing on the stylus 10 connected to the resistor 14, the transistor 43 is turned on, which sets the capacitor 46. In its charged state, the impedance presented by the capacitor 46 is buffered by the transistor 44 to provide a low output impedance. This is conventionally provided by low value capacitors and prevents the output of the resistor 14 changing due to actions of the other data switches in their write state. This also prevents the same effect through the RC couplings in the stylus head. The use of transistor buffering in the described arrangement minimises power dissipation.

The data switches are all reset by the output of the transformer 40 via the diode 47 and the transistor 44 of each switch. The capacitor 46 is also reset and thus acts as a data store in either the set or reset condition.

When the logic timing requires the data switches to be reset, a short duration pulse is applied to turn on the transistor 42 and hence the transistor 41 to switch on the transformer 40. The voltage switched across the primary is 75 volts and this produces a positive pulse of 300 volts, the reset pulse which is applied to all the data switches, such as the switch 18, via respective diodes 47, and thus to appropriate resistors such as the resistor 14.

At the same time as the reset pulse occurs a capacitor 54 is topped up to 300 volts by a diode 55. The capacitor 54 acts as a power supply source for the data switches 28 during the following inhibit time. The negative voltage level at output of the data switches is determined by the voltage to which the positive end of the capacitor 54 is held. As this is 0 volts then the negative end of the capacitor 54 will be topped up to −300 volts to provide the negative voltage level at the output of the data switches as appropriate.

Figure 7:
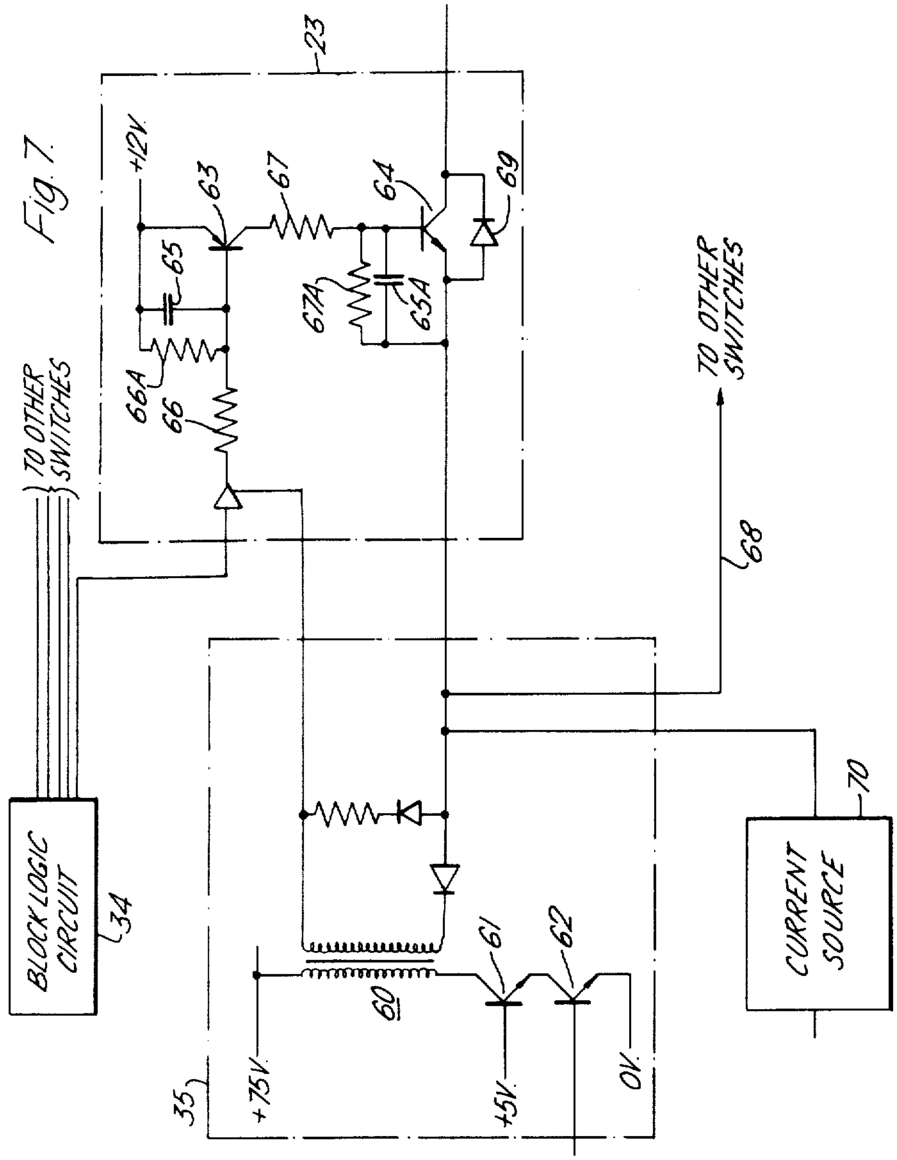
FIG. 7 shows the circuit diagram of another drive means and a block switch for the voltage supply system.

In FIG. 7, which shows the circuits of the write pulse generators 35 and block switch 23, a four-to-one transformer 60 has its primary connected in series with transistors 61 and 62 between a 75 volt supply and earth. Block switch 23 comprises two transistors 63 and 64, capacitors 65 and **65*a*, and resistors 66, 66*a*, 67 and 67*a*. The output at the collector of the transistor 64 represents the drive or operative signal to the respective capacitor block 22. Other switches of the block switches 29 (FIG. 5) are connected by a line 68 connected to the emitter of the transister 64**.

In use, a short duration writing pulse, 300 microseconds at −300 volts, is provided on the secondary of the transformer 60. Upon receipt of a block signal from the block logic circuit 34, the transistors 63 and 64 of an appropriate block switch are turned on during the whole of the block period. The writing pulse is timed to arrive at the end of each block signal and is supplied to the emitters of the transistors 64 in each block switch. The transistor 64 when turned on acts as a saturated switch and thus the output of the block switch 23, at the collector of the transistor 64, follows exactly the high voltage writing pulse applied to the emitter of that transistor and so the collector voltage drops to −300 volts. Other block switches in the matrix have not been selected, so that transistors 64 in such switches are turned off, and remain in high impedance states and therefore their collector voltages will not fall on application of the writing pulse. Therefore no operative signal is received by the respective block capacitor and associated styli of unselected block switches.

It will be noted that a diode 69 is provided to allow reverse set current to flow across the transistor 64. Also, a current source circuit 70 is provided and controlled by the timing logic such that set current flows during the appropriate part of the block periods.

Further it will be noted with reference to the drive circuit in FIG. 7, the switching of the block select logic can be relatively slow because signals from the block select logic are arranged to switch on the switches selected before the drive pulse is applied. The precise timing of the control to the block switch 23 is therefore relatively non-critical and only the application of the writing pulse to the base of the transistor 62 has to be especially synchronised to the similar pulse applied to the base of the transistor 42 in FIG. 6. This means relatively inexpensive transistors can be used for transistors 63 and 64.

Figure 8:
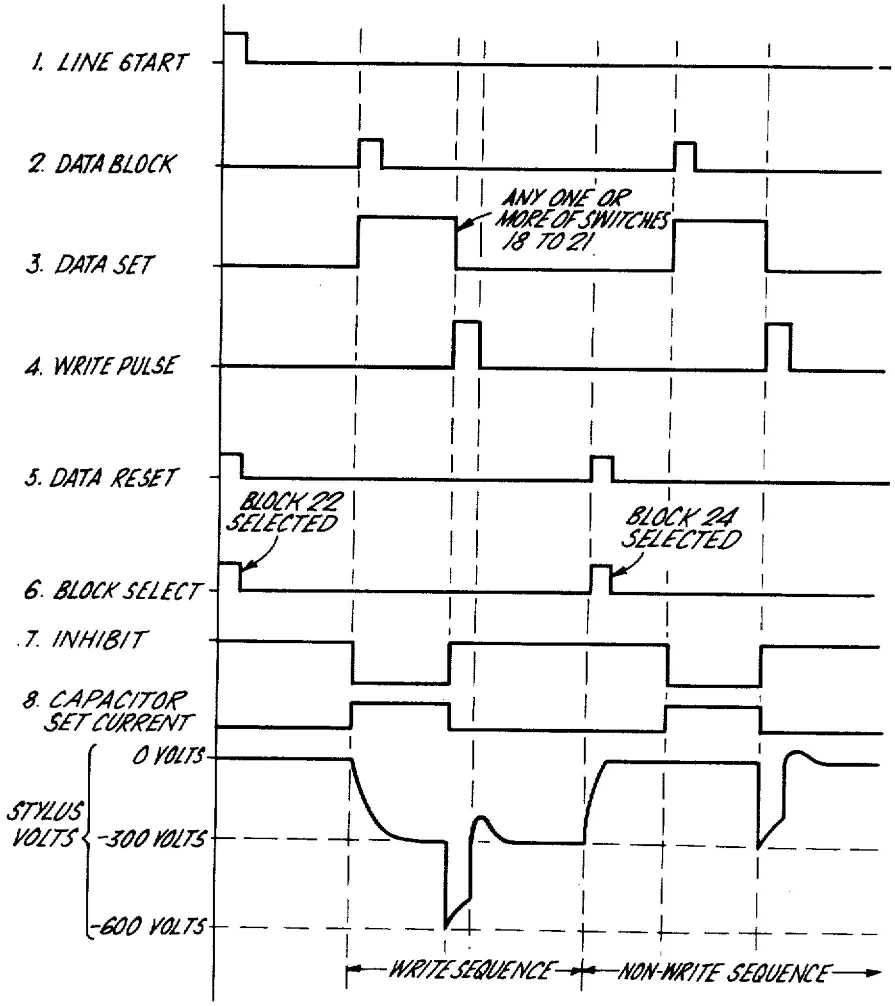
FIG. 8 shows timing logic for the circuits of FIGS. 6 and 7 and the voltage at a stylus end.

In FIG. 8, the first line of the diagram shows the beginning of a line of data supplied to the printing head. At the beginning of each line block 22 is selected, see line 6. On line 2, input of data is provided to select required data switches by providing simultaneously a set signal to switch on respective transistors 43, see FIG. 6. At the same time an inhibit signal is removed from the transistors 53. This causes as explained earlier the emitter of selected switch transistor 44 to drop to −300 volts, see voltage set on stylus in FIG. 8. The set signal is then removed and the inhibit signal to transistor 53 reapplied. The next signal to be applied is the writing pulse applied to the primary side of transformer 60 to drive the stylus negatively 300 volts so that styli already at −300 volts are caused to write.

The circuit of FIG. 6 is then reset and block 24 selected. In FIG. 8, there is no data selection in block 24 so that on the application of the next write pulse no writing takes place.

The data switch drive in FIG. 6 is then reset again and the next block selected. In this way each block is taken in turn until the line has been fully dealt with. The next line is then begun and the sequence followed again.

In the description short pulses are used; one advantage is that the record medium can be moved continuously in such an arrangement and this provides considerable advantages over the prior art. Previously, because longer pulses were used, a potential applied while the record medium was in motion may cause writing by contact charging. In fact, contact charging did occur for voltage differences not greatly in excess of 100 volts, that is, well below Paschen breakdown levels, and cause prints to be produced having poor background. This problem was tackled in the past by laboriously providing continuous interruption of the record medium so that writing occurred or voltages were only applied when the record medium was stationary.

It will be noted that high voltae DC supplies are not required because the high voltage is generated within the system by the transformers 40 and 60.

It will be appreciated that the stylus energising system described may also be used with the printing system described in U.S. Pat. Nos. 3,611,419 and 3,859,960. Further, the phasing to avoid false writing described in U.S. Pat. No. 3,611,419 is not required because the system as described in selecting one block switch with aligned capacitors at a time overcomes the problem solved by phasing.

While the invention has been particularly described and shown with reference to a preferred embodiment thereof, it will be understood by those skilled in the art that variations and modifications may be made without departing from the spirit and scope of the invention.

What is claimed is:

1. A control system for an electrographic stylus writing apparatus including a set of styli, a matrix connected to supply selectively to each stylus two electrical pulses which are required to have coincidence to render the stylus operative, first electrical drive means for supplying one of said two pulses which is connected in parallel to said matrix through a plurality of first selectable switches and resistors, each such resistor connected in series with a stylus, second electrical drive means for supplying the other of said two pulses which is connected to said matrix through a plurality of second selectable switches and capacitors, each such capacitor coupled to subgroups of said stylus, electrical control means arranged to open and close said first and second selectable switches such that said pulses are applied to operate each selected stylus, and timing means arranged to control the selection of said first selectable switches before the application of the first pulse from said first electrical drive means and to control the selection of said second selectable switches before the application of the second pulse from said second electrical drive means.

2. The control system according to claim 1, in which said first electrical drive means includes capacitor means arranged to be charged-up prior to the application of said pulses such that the power stored in said capacitor comprises said first pulse.

3. The control system according to claim 1, in which one or each electrical drive means includes a transformer arranged to provide, in response to a voltage signal applied to its primary, said pulse or pulses at a higher voltage.

4. The control system according to claim 1, including timing means arranged to control the application of the first pulse to occur before the application of the second pulse.

5. In a matrix array control system for operation of an electrographic writing apparatus including a plurality of styli selectively driven by pulses through RC networks coupled to said styli, said networks comprising a resistor in each line to each of said styli and a capacitor coupled to subgroups of said styli, first electrical drive means including a plurality of switch means each coupled to corresponding styli in each of said subgroups, second electrical drive means including a plurality of switch means each coupled to subgroup capacitor, said first drive means including inhibit means, the removal of which provides an enabling pulse from voltage supply means to preselected of said first drive switch means whereby a predetermined voltage level is applied and maintained to said selected styli via said preselected switch means and after which said inhibit means is reapplied, said second drive means providing a writing pulse after reapplication of said inhibit means sequentially to said second time drive switch means and raise said predetermined voltage level on said selected styli sufficient to permit their operation and means to thereafter reset said voltage supply means.

* * * * *